United States Patent [19]

Wakahara et al.

[11] Patent Number: 5,429,561
[45] Date of Patent: Jul. 4, 1995

[54] SHIFT CONTROL SYSTEM WITH ENGAGEMENT PRESSURE AS A FUNCTION OF TORQUE INPUT AND THE TYPE OF SHIFTS

[75] Inventors: Tatsuo Wakahara, Kawasaki City; Masahiro Yamamoto, Atsugi, both of Japan

[73] Assignee: Nissan Motor Co., Ltd., Yokohama City, Japan

[21] Appl. No.: 1,713

[22] Filed: Jan. 7, 1993

[30] Foreign Application Priority Data

Jan. 7, 1992 [JP]  Japan .................. 4-000777

[51] Int. Cl.⁶ .................................. F16H 5/40
[52] U.S. Cl. .................... 477/156; 477/110; 477/143
[58] Field of Search .......... 74/866, 867; 364/424.1; 477/156, 143, 906, 164, 110

[56] References Cited

U.S. PATENT DOCUMENTS

| 4,790,418 | 12/1988 | Brown et al. | 192/32 |
|---|---|---|---|
| 4,967,385 | 10/1990 | Brekkestran et al. | 364/571.03 |
| 4,981,053 | 1/1991 | Yamaguchi | 477/158 |
| 4,982,621 | 1/1991 | Sano | 477/158 |
| 5,016,174 | 5/1991 | Ito et al. | 477/906 X |
| 5,046,175 | 9/1991 | Lentz et al. | 477/906 X |
| 5,047,936 | 9/1991 | Ishii et al. | 477/158 |
| 5,063,814 | 11/1991 | Baba et al. | 477/158 |
| 5,079,970 | 1/1992 | Butts et al. | 477/110 X |
| 5,123,302 | 6/1992 | Brown et al. | 74/866 |
| 5,151,858 | 9/1992 | Milunas et al. | 364/424.1 |
| 5,179,875 | 1/1993 | Brown | 477/143 |
| 5,188,005 | 2/1993 | Sankpai et al. | 477/143 |
| 5,213,013 | 5/1993 | Fujiwara et al. | 477/150 |
| 5,231,898 | 8/1993 | Okura | 74/867 X |
| 5,241,477 | 8/1993 | Narita | 364/424.1 |
| 5,368,531 | 11/1994 | Ando et al. | 477/143 X |

*Primary Examiner*—Dirk Wright
*Assistant Examiner*—Kholo Ta
*Attorney, Agent, or Firm*—Foley & Lardner

[57] ABSTRACT

A shift control system for obtaining a smooth shift feeling in a shifting necessitating redeployment of friction elements. The shift control system is comprised of a sensor which detects a state that disengagement pressure of a friction element to be disengaged almost becomes zero during shifting. In reply to the detection of the sensor, a controller adjusts engagement pressure of the other friction element to be engaged at a predetermined value determined according to input torque and gear ratio.

5 Claims, 6 Drawing Sheets

| FRICTION ELEMENTS / SPEEDS | | L/C | H/C | 35R/B | 2/B | LR/B |
|---|---|---|---|---|---|---|
| FORWARD | 1st | ○ | | | | △ |
| | 2nd | ○ | | | ○ | |
| | 3rd | ○ | | ○ | | |
| | 4th | ○ | ○ | | | |
| | 5th | | ○ | ○ | | |
| REVERSE | | | | ○ | | ○ |

FIG.1C

| FRICTION ELEMENTS / CHAMBERS / SPEEDS | | L/C | | H/C | 35R/B | | | 2/B | LR/B | |
|---|---|---|---|---|---|---|---|---|---|---|
| | | LCA | LCR | | 5RA | 24R | 3RA | | 1A | RA |
| FORWARD | 1st | ○ | | | | | | | △ | |
| | 2nd | ○ | | | | △ | | ○ | | |
| | 3rd | ○ | | | | | ○ | | | |
| | 4th | ○ | | ○ | | △ | | | | |
| | 5th | ○ | ○ | ○ | ○ | | | | | |
| REVERSE | | | | | ○ | △ | | | | ○ |

SHIFT CONTROL SYSTEM WITH ENGAGEMENT PRESSURE AS A FUNCTION OF TORQUE INPUT AND THE TYPE OF SHIFTS

BACKGROUND OF THE INVENTION

1. Field of the Invention

The present invention relates to improvements in a shift control system for an automatic transmission, and more particularly to a shift control system which improves shift feeling during shifting.

2. Description of the Prior Art

It is well known that an automatic transmission for an automotive vehicle is shiftable in speed ratio by selecting a predetermined speed by selective hydraulic actuation of friction elements such as a clutch and a brake to change the friction elements to be operated.

Accordingly, some types of shifting necessitate redeployment of the friction elements where one friction element or high clutch is engaged while the other friction element or band brake is released as is seen during 2→2 shift of the automatic transmission described in a Maintenance Manual for NISSAN RE4F02A type Automatic Trans-axle, published by NISSAN MOTOR CO. LTD., in March, 1988. In such a shifting, a shift feeling is largely effected by the relationship of the raising of the engagement pressure and the lowering of the disengagement pressure.

However, since in the above-mentioned 2→3 shift the lowering and raising controls of the hydraulic pressure for the redeployment of the friction elements is not individually controlled, the shift feeling has a limit in its improvement. Furthermore, it is necessary to control the timing of the redeployment of both friction elements to be operated in the relation therebetween in order to obtain a preferred shift feeling. For example, when the engagement pressure of a friction element to be engaged is raised too sharply, a transmission output torque is largely fallen in torque phase as indicated by a two-dot chain line in FIG. 6. This generates an uncomfortable shift feeling such as a momentary braking feeling. Further, when the raising of the engagement pressure is too late, racing of the engine is generated. This causes a shock during the shifting operation which degrades shift feeling. On the other hand, although a one-way clutch for the shifting is often installed in such an automatic transmission and used for carrying out a smooth shifting, it is necessary that such a one-way clutch is disposed along an inner side of a transmission case. This increases a diameter of the transmission in size.

SUMMARY OF THE INVENTION

It is an object of the present invention to provide an improved shift control system for an automatic transmission for use in an automotive vehicle, wherein shifting is smoothly carried out without using a one-way clutch.

According to one aspect of the present invention, there is provided a shift control system of an automatic transmission for use in an automotive vehicle, the automatic transmission which has a plurality of friction elements processing a shifting operation in a manner to engage one of the friction elements and to disengage the other one of the friction elements, the engagement and disengagement being carried out by controlling hydraulic pressure supplied to the friction elements, respectively, the shift control system comprising:

means for detecting and outputting a drained state where disengagement pressure of the disengaged friction element is lower than a first predetermined value; and means for adjusting engagement pressure of the engaged friction element at a second predetermined value which is determined according to input torque and gear ratio when said adjusting means receives a signal indicative of the drained state from said detecting means.

According to another aspect of the present invention, there is provided, in a shift control system of an automatic transmission having a plurality of friction elements, wherein shifting includes engagement of one of the friction elements and disengagement of another one of the friction elements which are carried out by a method of controlling hydraulic pressure supplied to the friction elements, respectively, said method comprising the steps of:

detecting disengagement pressure of the disengaged friction element;

comparing the disengagement pressure to a first predetermined value in order to detect a moment at which a value of the disengagement pressure approaches zero; and adjusting engagement pressure of the engaged friction element at a second predetermined value determined according to input torque and gear ratio when the moment is detected.

BRIEF DESCRIPTION OF THE DRAWINGS

In the drawings, like reference numerals designate like parts and throughout all figures, in which.

DESCRIPTION OF THE INVENTION

Referring to the drawings, preferred embodiments of the present invention will be described.

Figure 1A:
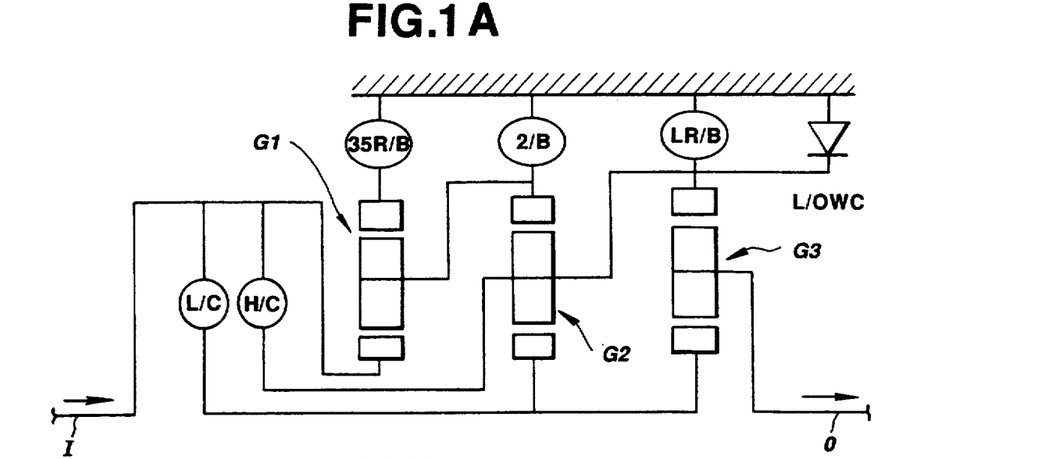
FIG. 1A is a skeleton drawing showing a gear train of an automatic transmission to which the present invention is applied.

Referring first to FIG. 1A, a gear train of an automotive transmission comprises first, second and third planetary gear sets G1, G2 and G3 coaxially disposed between input and output shafts I, O. These first, second and third planetary gear sets G1, G2 and G3 are simple planetary gear sets having first, second and third sun gears, first, second and third ring gears, and first, second and third carriers, respectively. The first sun gear is connected to the input shaft I, and the second and third sun gears are connectable to the input shaft I by a low clutch L/C, and the second carrier is connectable to the input shaft I by a high clutch H/C. The first carrier and the second ring gear are integrally connected with each other and fixable by a second brake 2/B. The first ring gear is fixable by a third speed/fifth speed/reverse band brake 35R/B. Additionally, the second carrier and the third ring gear are integrally connected with each other and fixable by a low reverse brake LRB. The second carrier and the third ring gear are prevented by a low one-way clutch L/OWC from rotating in the direction opposite to the rotating direction of the input shaft I.

Figure 1B:
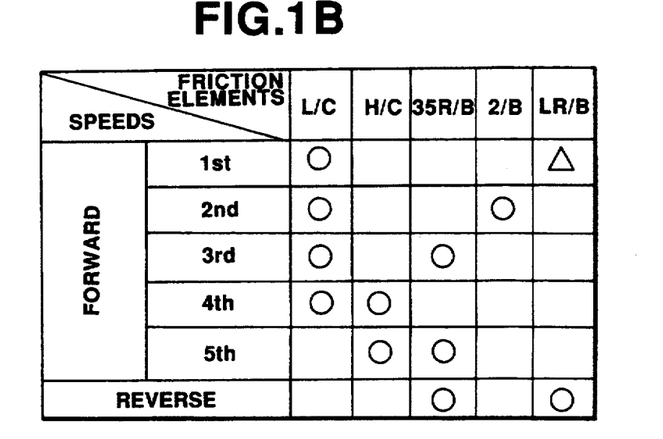
FIG. 1B is a table showing an engagement logic of friction elements.
Figure 1C:
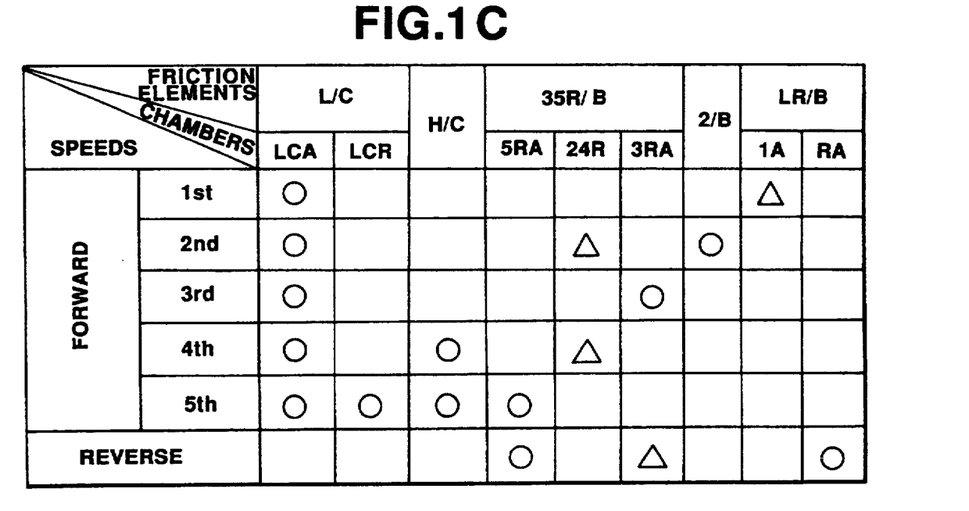
FIG. 1C is a table similar to FIG. 1B, further with chambers of the friction elements.

Referring to FIG. 1B, the gear train can select forward first speed to fifth speed and reverse by a combination of the friction element(s) engagement (cell with a circle) and the friction element(s) disengagement (cell with a void). Referring to FIG. 1C, a cell with a circle indicates a chamber of each friction element to be supplied with hydraulic fluid for obtaining engagement and disengagement thereof. It is to be noted that, in engagement logic tables in FIGS. 1B and 1C, a cell with a triangle indicates a friction element of a chamber which is unconcerned with a selection of the speed, but to be engaged or supplied with hydraulic fluid for the purpose which will be described hereinafter.

Figure 2:
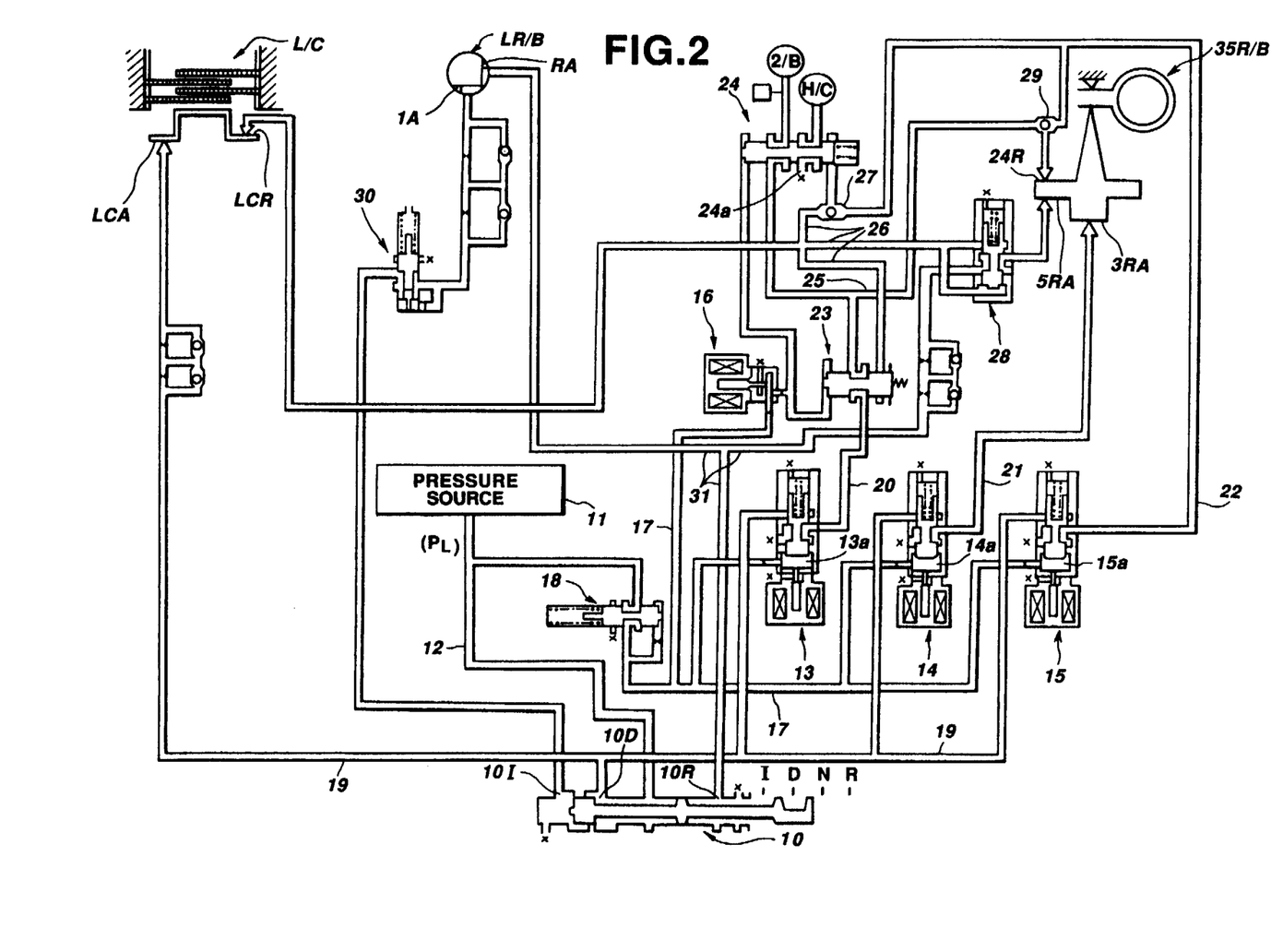
FIG. 2 is a circuit diagram showing a shift control hydraulic circuit of the gear train.

Referring to FIG. 2, there is shown a shift control hydraulic circuit for the gear train in FIG. 1A, by which an engagement logic in FIGS. 1B and 1C is achieved. 10 designates a manual valve having forward automatic change speed range (D range) as illustrated in FIG. 2, first speed engine brake range (I range), stop range (N range), and reverse range (R range) which are manually established by a driver in accordance with a desired cruising pattern. It is to be noted that the manual valve 10 also has parking range (P range) and second engine brake range (II range), which are omitted here as failing to have a connection with the present invention.

The manual valve 10 is arranged such that line pressure PL built up in a pressure source 11 and outputted to a circuit 12 is outputted to one of a plurality of ports in accordance with selected range, such as to a port 10D in D range, a port 10I in I range, and a port 10R in R range. In N range, the line pressure circuit 12 does not communicate with any of the ports, and all the ports are drained off.

13, 14, 15 designate first, second and third duty solenoid valves, respectively, and 16 designates a solenoid selector valve. These valves 13–16 are supplied with constant pilot pressure via a circuit 17. This pilot pressure is produced by reducing line pressure PL to a predetermined value in a pilot valve 18.

Additionally, the duty solenoid valves 13, 14, 15 are connected to a forward pressure circuit 19 which in turn communicates with an apply chamber LCA of the low clutch L/C.

At 0% in duty, the duty solenoid valves 13, 14, 15 preserve positions as illustrated in FIG. 2 wherein pilot pressure within chambers 13a, 14a, 15a is all drained off to achieve drainage of circuits 20, 21, 22. As the duty is increased to 100%, pressure within the chambers 13a, 14a, 15a is built up to the same value as pilot pressure so as to achieve built up of pressure within the circuits 20, 21, 22 up to the same value as line pressure within the forward pressure circuit 19.

In the ON state, the solenoid selector valve 16 supplies pilot pressure within the circuit 17 to selector valves 23, 24 so as to cause rightward displacement as viewed in FIG. 2, whereas in the OFF state, the solenoid selector valve 16 puts the selector valves 23, 24 in positions as illustrated in FIG. 2. The selector valve 23 allows communication of the circuit 20 with a circuit 25 in the position as illustrated in FIG. 2, whereas the selector valve 23 allows communication of the circuit 20 with a circuit 26 upon rightward displacement. The selector valve 24 allows communication of the second brake 2/B with the circuit 25, and the high clutch H/C with a drain port 24a in the position as illustrated in FIG. 2, whereas the selector valve 24 allows communication of the second brake 2/B with the drain port 24a, and the high clutch H/C with an output port of a shuttle valve 27 upon rightward displacement.

The shuttle valve 27 has one input port connected to the circuit 26 which also communicates with a fifth speed and reverse apply chamber 5RA of the band brake 35R/B via a release chamber LCR of the low clutch L/C and a selector valve 28. The shuttle valve has the circuits 22, 24 communicate with a second and fourth speeds release chamber 24R of the band brake 35R/B via a shuttle valve 29, and the circuit 21 is connected to a third speed and reverse apply chamber 3RA of the band brake 35R/B.

The port 10I of the manual valve 10 is connected to a first speed apply chamber 1A of the low reverse brake LRB via an I range pressure reducing valve 30. The port 10R of the manual valve 10 is connected to a reverse apply chamber RA of the low reverse brake LR/B via a circuit 31, and to a fifth speed and reverse apply chamber 5RA of the band brake 35R/B via the selector valve 28.

Figure 3:
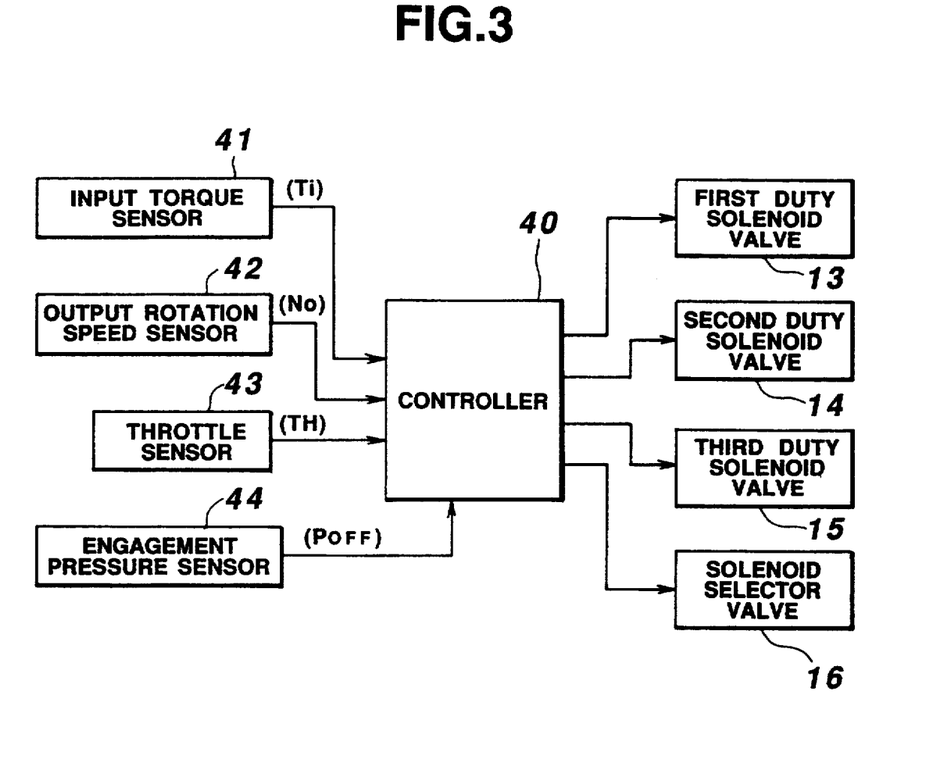
FIG. 3 is a block diagram of an electrical control system for controlling valves in the shift control hydraulic circuit.

As shown in FIG. 3, the first, second and third duty solenoid valves 13, 14 and 15 and the solenoid selector valve 16 are connected to a controller 40 for the control thereof. The controller 40 is also connected to an input torque sensor 41 which detects a transmission input torque Ti and outputs a signal indicative of the transmission input torque Ti, an output rotation sensor 42 which detects a transmission output rotating speed $N_O$ and outputs a signal indicative of the transmission output rotating speed $N_O$, a throttle sensor 43 which detects an engine throttle opening TH and outputs a signal indicative of the engine throttle opening TH, and an engagement pressure sensor 44 which detects an engagement pressure $P_{OFF}$ of the second brake 2/B and outputs a signal indicative of the engagement pressure $P_{OFF}$.

Next, the operation of this embodiment will be described. In N range of the manual valve 10, line pressure within the circuit 12 is not outputted to any of the ports 10D, 10I, 10R, and all the ports are drained off. As a result, all the friction elements are out of operation or released, so that the automatic transmission fails to perform power transmission between the input and output shafts I, 0, while keeping a vehicle at a stand still.
In first speed:

When the manual valve 10 is put in D range in accordance with a driver's request for forward cruising, line pressure $P_L$ within the circuit 12 is output to the port 10D. This line pressure $P_L$ out of the port 10D comes to the apply chamber LCA of the low clutch L/C via the circuit 19 and engages this clutch L/C. On the other hand, when the cruising condition forces a selection of first speed, the controller 40 puts the duty solenoid valves 13, 14, 15 at 0% in duty, and turns off the solenoid selector valve 16. Thus, since the circuits 20, 21, 22 are out of pressure, and the selector valves 23, 24 are positioned as illustrated in FIG. 2, the release chamber LCR of the low clutch L/C, the second brake 2/B, the high clutch H/C, and all the chambers 3RA, 5RA, 24R of the band brake 35R/B are drained off. Accordingly, the automatic transmission has only the low clutch L/C engaged, and first speed is selected.

In first speed, the gear train as shown in FIG. 1 cannot obtain engine brake due to existence of the low one-way clutch L/OWC. If engine brake is needed in first speed, the driver puts the manual valve 10 in I range to output line pressure from not only the port 10D, but the port 10I. At that time, line pressure out of the port 10I comes to a chamber 1A of the low reverse brake LR/B via the reducing valve 30 (see FIG. 1C, a corresponding cell with a triangle), producing additional actuation of this brake LR/B, thus enabling engine brake in first speed.

In second speed:

When, in D range, first speed, the cruising condition forces a selection of second speed, the controller 40 gradually increases the duty of the first duty solenoid valve 13 to produce and gradually increase pressure within the circuit 20. This pressure comes to the second brake 2/B via the selector valves 23, 24 to gradually engage the former, enabling upshift change speed from first to second speed without a shock.

Engagement pressure of the second brake 2/B comes to the release chamber 24R of the band brake 35R/B via the shuttle valve 29 (see FIG. 1C, a corresponding cell with a triangle) and prohibits engagement of the band brake 35R/B in cooperation with a return spring. As a result, even if the duty solenoid valve 13 produces pressure in the circuit 21 due to failure of a control system, the band brake 35R/B cannot be engaged and can avoid impossible cruising due to interlock of the automatic transmission.

In third speed:

When, in second speed, the cruising condition forces a selection of third speed, the controller 40 gradually decreases the duty of the first duty solenoid valve 13 to reduce pressure within the circuit 20 or second brake 2/B, whereas it gradually increases the duty of the second duty solenoid valve 14 to produce and gradually increase pressure within the circuit 21 or chamber 3RA of the band brake 35R/B. This causes redeployment of the friction elements that the second brake 2/B is released while the band brake 35R/B is engaged, and enables upshift change speed from second to third speed.

Since, during this shifting, engagement pressure of the second brake 2/B to be released and engagement pressure of the band brake 35R/B to be engaged are controlled individually by the duty solenoid valves 13 and 14, release timing of the second brake 2/B and engagement timing of the band brake 35R/B can be adjusted properly and freely in accordance with the cruising condition and specification of the vehicle, as will be discussed hereinafter with reference to FIG. 4 specification of the vehicle.

In fourth speed:

When, in third speed, the cruising condition forces a selection of fourth speed, the controller 40 turns on the solenoid selector valve 16 to switch the selector valves 23, 24 in the rightward position as viewed in FIG. 2 by pilot pressure of the circuit 17. At the same time, it gradually decreases the duty of the second duty solenoid valve 14 to reduce pressure within the circuit 21 (pressure within the apply chamber 3RA of the band brake 35R/B), and gradually increases the duty of the third duty solenoid valve 15 to obtain a gradual increase in pressure within the circuit 22 (engagement pressure coming to the high clutch H/C via the shuttle valve 27 and the selector valve 24). This causes redeployment of the friction elements that the band brake 35R/B is released while the high clutch H/C is engaged, and enables upshift change speed from third to fourth speed.

Since, during this shifting also, engagement pressure within the chamber 35A of the band brake 35R/B to be released and engagement pressure of the high clutch H/C to be engaged are controlled individually by the duty solenoid valves 14 and 15, the same effect as that one during 2→3 shift can be expected.

Engagement pressure of the high clutch H/C within the circuit 22 comes to the release chamber 24R of the band brake 35R/B via the shuttle valve 29 (see FIG. 1C, a corresponding cell with a triangle), and prohibits engagement of the band brake 35R/B in cooperation with the return spring. As a result, even if the duty solenoid valve 14 produces pressure in the circuit 21 due to failure of the control system, the band brake 35R/B cannot be engaged, and interlock of the automatic transmission is avoided.

In fifth speed:

When, in fourth speed, the cruising condition forces a selection of fifth speed, the controller 40 decreases the duty of the third duty solenoid valve 15 to reduce pressure within the circuit 22, and increases the duty of the first duty solenoid valve 13 to obtain an increase in pressure within the circuit 20. A decrease in pressure within the circuit 22 allows the high clutch H/C to release while pressure within the circuit 20 comes to the high clutch HC via the selector valve 23, the shuttle valve 27, the circuit 26, and the selector valve 24, keeping the high clutch H/C engaged. Pressure directed to the circuit 26 also comes to the release chamber LCR of the low clutch L/C, releasing same due to a larger pressure acting area of the chamber LCR than the chamber LCA. Additionally, pressure within the circuit 20 comes to the apply chamber 5RA of the band brake 35R/B via the selector valve 28, and the release chamber 24R of the band brake 35R/B is drained off due to a decrease in pressure within the circuit 22, achieving engagement of the band brake 35R/B. This allows the automatic transmission to cause upshift change speed from fourth to fifth speed.

Likewise, 5→4, 4→3, 3→2, and 2→1 downshift change speeds are achieved by the corresponding control of the duty solenoid valves 13, 14, 15 and the solenoid selector valve 16 in a predetermined manner. In such downshift change speeds wherein a decrease and increase in engagement pressure of the friction elements to be redeployed by the duty solenoid valves 13, 14, 15 are controllable individually, the same effect is obtained as that during 2→3 shift.

Reverse:

When the manual valve 10 is put in R range in accordance with a driver's request for reverse, line pressure PL within the circuit 12 is outputted to the circuit 31 from the port 10R, and the other ports are all drained off. Basically, the controller 40 puts the duty solenoid valves 13, 14, 15 at 0% in duty to obtain non-pressure state of the circuit 20, 21, 22, and turns off the solenoid selector valve 16 to position the selector valves 23, 24 as illustrated in FIG. 2.

Pressure within the circuit 31 comes to the apply chamber RA of the low reverse brake LR/B to engage same on the one hand, and comes to the apply chamber 5RA of the band brake 35R/B via the selector valve 28 to engage same on the other hand. This allows the automatic transmission to select reverse.

A greater brake capacity of the band brake 35R/B is desirable upon, e.g., a quick depression of the accelerator pedal. In that case, the controller 40 increases the duty of the second duty solenoid valve 14 to produce within the circuit 21 (see FIG. 1C, corresponding cells with a triangle). This pressure comes to the chamber 3RA to enlarge engaging force of the band brake 35R/B, and improves the brake capacity thereof as requested.

The manner of operation of the shift control according to the present invention will be discussed hereinafter with reference to a flow chart of FIG. 4 and a time chart of FIG. 6.

Figure 4:
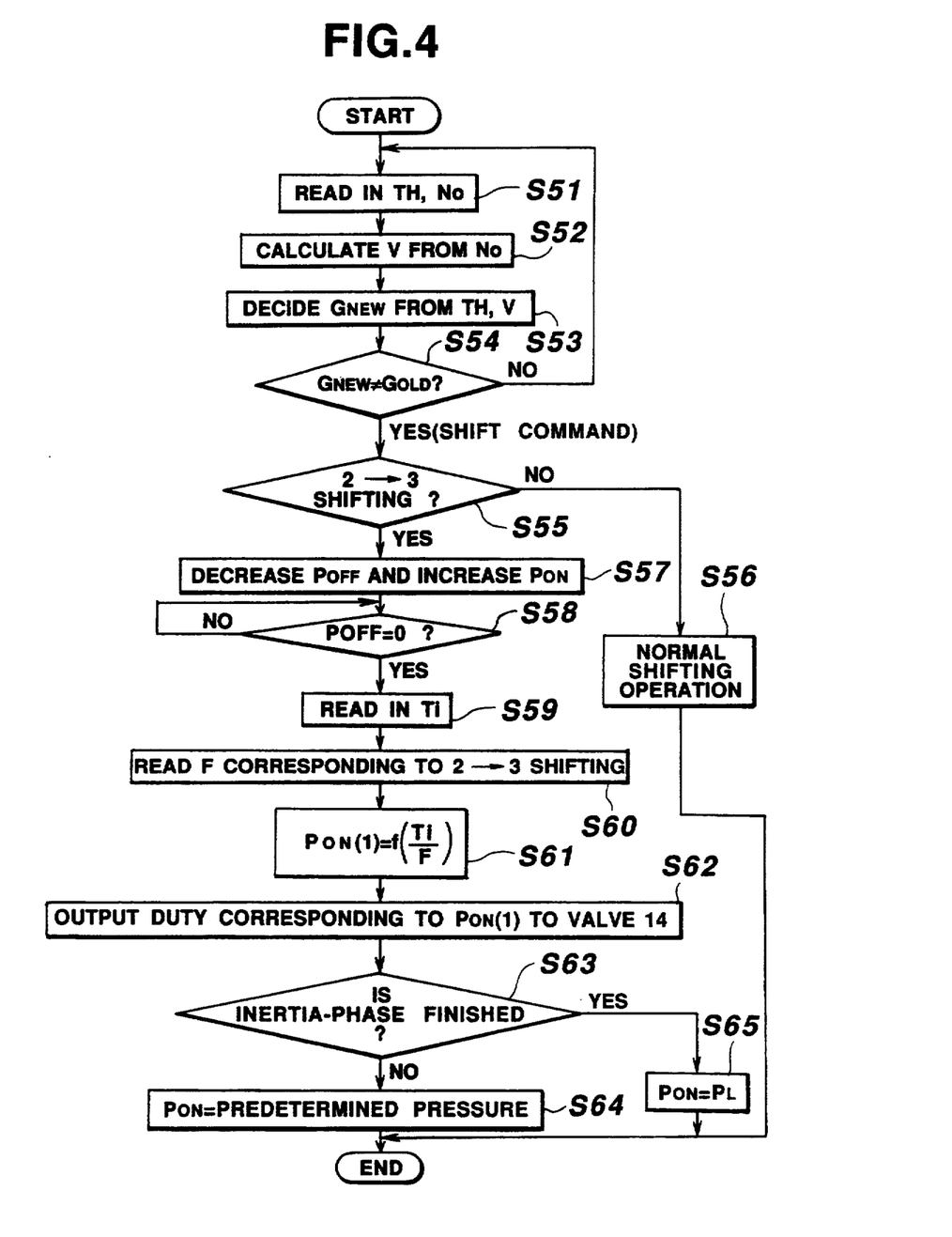
FIG. 4 is a flow chart showing a control program carried out by a controller shown in FIG. 3.

The flow chart of FIG. 4 shows a main routine carried out at predetermined time intervals. The time chart of FIG. 6 shows changes of the transmission output torque and engagement and disengagement pressures $P_{ON}$, $P_{OFF}$ during shifting operation. In FIG. 6, a continuous line of the transmission output torque indicates a change in a preferred operation for minimizing the falling of the output torque, a dashed line of the transmission output torque indicates a change in an improper operation causing an uncomfortable shift feeling, a continuous line of pressure indicates a change of disengagement pressure $P_{OFF}$, a dotted line indicates a change of engagement pressure $P_{ON}$ according to the first embodiment, and a two-dot chain line indicates a change of engagement pressure according to a second embodiment which is mentioned after.

As shown in FIG. 4, in a step S51, the throttle opening TH and the output rotating speed $N_O$ are read in the controller 40. In a step S52, a vehicle speed V is calculated from the output rotating speed $N_O$. In a step S53, a shift position Gnew which is optimum for the running condition of the automotive vehicle is decided from a map on the basis of the throttle opening TH and the vehicle speed V.

In a step S54, it is judged whether or not the decided optimum shift is the same as the shift in use. When the judgment in the step S54 is "NO", the program returns to the step S51. When the judgment in the step S54 is "YES", the program proceeds to a step S55 wherein it is checked whether the 2→3 shifting is carried out or not. When the judgment in the step S55 is "NO", the program proceeds to a step S56. When the judgment in the step S55 is "YES", the program proceeds to a step S57 wherein the disengagement pressure $P_{OFF}$ of the brake 35R/B is drained off by decreasing the duty of the valve 13, and the engagement pressure $P_{ON}$ to the 3RA chamber of the brake 35R/B is raised by increasing the duty of the valve 14 (corresponding to a moment $t_0$ in FIG. 6). Following this, in a step S58 it is checked whether the disengagement pressure $P_{OFF}$ equals to 0 or not (corresponding to the moment t1). When the judgment in the step S58 is "NO", the program repeats the step S58 until the judgment in the step S58 changes to "YES". When the judgment in the step S58 is "YES", the program proceeds to a step S59 wherein the input torque Ti of the transmission is read in. Then, in a step S60 a coefficient F determined by a gear ratio corresponding to the kind of the shifts (wherein 2→3 shifting) is read in. In a step S61, a preset value $P_{ON}(1)$ of the engagement pressure $P_{ON}$ at the moment t1 for minimizing the falling of the output torque ($T_{min}=T_{OE}$), which is shown by the continuous line in FIG. 6, is calculated by the following function f which is functioned by the input torque Ti and coefficient F:

$$P_{ON}(1) = f(Ti/F)$$

The minimum output torque Tmin (which is generally same as the falling of the torque) in a torque phase is represented by the following equation functioned by the input torque Ti and the transmitted torque $T_{ON}$:

$$\begin{aligned} T_{min} &= A \cdot Ti - B \cdot T_{ON} \\ &\approx A \cdot Ti - B' \cdot P_{ON} \end{aligned} \quad (1)$$

where A and B are coefficients decided by the gear ratio during 2→3 shifting, and B' is a constant into which B is converted as a pressure.

When the transmitted torque of the disengaged element (the brake 2/B) becomes $T_{OFF}$, the above-mentioned input torque Ti is represented by the following equation:

$$\begin{aligned} Ti &= F \cdot T_{ON} - G \cdot T_{OFF} \\ &\approx F \cdot T_{ON} - G' \cdot T_{OFF} \end{aligned} \quad (2)$$

where F and G are coefficients decided by the gear ratio during 2→3 shifting, and F' and G' are constants into which F and G are converted as a pressure.

When the equation (2) is established, the torque phase is finished. The change of the engagement pressure $P_{ON}$ and the disengagement pressure $P_{OFF}$ are represented by the following equations functioned by a time period t from the moment $t_0$:

$$P_{ON} = a \cdot t \quad (3)$$

$$P_{OFF} = b - c \cdot t \quad (4)$$

Additionally, the input torque Ti of the equation (2) is represented as follows:

$$\begin{aligned} Ti &= F \cdot at - G \cdot (b - ct) \\ &= (Fa + Gc)t - Gb \end{aligned} \quad (5)$$

Accordingly, it is noted that the sharper the gradient a of the pressure $P_{ON}$ and the gradient c of the pressure $P_{OFF}$ become, the shorter the time period $t_t$ of the torque phase becomes.

If the equation (1) is rearranged by substituting the equation (2) into, the minimum output torque $T_{min}$ during the torque phase is represented as follows:

$$\begin{aligned} T_{min} &= A(FT_{ON} - GT_{OFF}) - B \cdot T_{ON} \\ &= (AF - B)T_{ON} - AGT_{OFF} \end{aligned} \quad (6)$$

According to the equation (6), by finishing the torque phase while establishing the equation (2) during $T_{OFF}=0(P_{OFF})$, the falling of the torque becomes minimum. This realizes the optimum output torque curve as shown in FIG. 6 by which the best shift feeling is obtained.

Since the disengagement pressure $P_{OFF}$ is set as represented by the equation (4), a time period from a moment $t_0$ of the shift command to a moment of $P_{OFF}=0$ is represented by the following equation:

$$t = b/c \quad (7)$$

Figure 6:
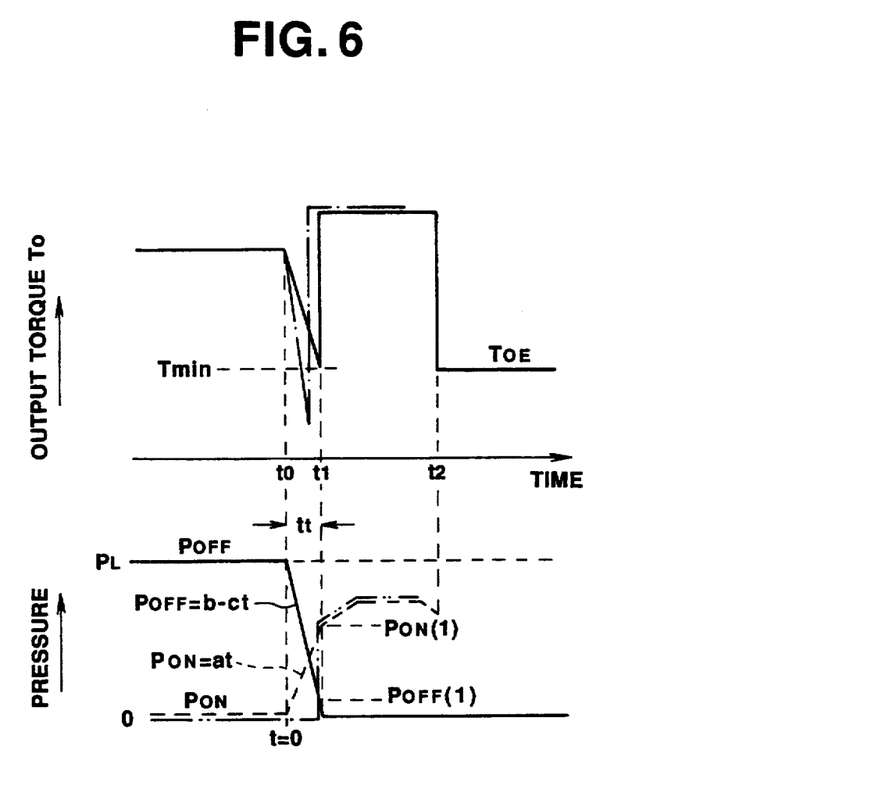
FIG. 6 is a time chart showing a preferred operation carried out by the shift control system according to the present invention.

If the equation (2) is established while the equation (7) is established, the output torque curve becomes a curve shown by a continuous line in FIG. 6, and the falling of the torque becomes minimum. Accordingly, the shift feeling becomes the same as that of a case using a one-way clutch. Hence the input torque $T_i$ for obtaining such a best shift feeling is represented by the combination of the equations (2), (3) and (7) as follows:

$$T_i = F \cdot P_{ON} \qquad (8)$$
$$= F \cdot at$$
$$= F \cdot a \cdot b/c$$

Accordingly, in order to optimize the shifting performance, it is necessary that the gradient a of the engagement pressure $P_{ON}$ and the gradient c of the disengagement pressure $P_{OFF}$ satisfy the following equation:

$$a/c = Ti/(F \cdot b) \qquad (9)$$

Since the responsibility of the hydraulic pressure during release is inferior to that during engagement, the gradient a of the engagement pressure $P_{ON}$ is determined such that the gradient c of the disengagement pressure $P_{OFF}$ is sharpened as possible so as to momentarily set the duty of the valve 13 to 0 and the equation (9) is satisfied then, in order to shorten the torque phase time period. Accordingly, the gradient c in the equation (9) is regarded as a constant. Hence in order to satisfy the condition of the equation (9), it is necessary that the target value $T_{ON}(1)$ of the transmitted torque at the accomplished moment $t_i$ of the torque phase is represented as follows:

$$T_{ON}(1) = Ti/F$$

The engagement pressure $P_{ON}(1)$ in FIG. 6 which accomplishes the above equation is represented as follows:

$$P_{ON}(1) = Ti/F$$

Accordingly, it becomes possible to obtain the torque curve which has a minimum falling of the torque as shown in FIG. 6 and to optimize the shift feeling if the function f(Ti/F) shown in the step S61 in FIG. 4 is represented as follows:

$$P_{ON}(1) = f(Ti/F)$$
$$= Ti/F$$

In the step S62 in FIG. 4, the engagement pressure $P_{ON}$ to the chamber 3RA is set at $P_{ON}(1)$ at a moment the torque phase is finished as shown in FIG. 6 by outputting a signal representative of $P_{ON}(1)$ to the valve 14.

In the step S63, it is judged whether an operation reaches a moment t2 in FIG. 6 after the finish of the inertia phase or not. When the operation is in the inertia phase, the program proceeds to the step S64 wherein the duty of the valve 14 is controlled so as to set the engagement pressure $P_{ON}$ to a predetermined pressure shown in FIG. 6. When the operation is on the moment t2, the engagement pressure $P_{ON}$ is adjusted at the line pressure $P_L$ and the shift operation is finished.

During 2→3 shifting, when the disengagement pressure $P_{OFF}$ becomes 0, the torque phase is finished so as to set the engagement pressure $P_{ON}$ to a predetermined value $P_{ON}(1)$ which satisfies the equation (9). Accordingly, the shift feeling can be set optimum by minimizing the falling of the torque during the redeployment of the engagement and disengagement operation of two elements. Furthermore, since such a best shift feeling is obtained without a one-way clutch, the automatic transmission is formed without being enlarged in diameter.

Figure 5:
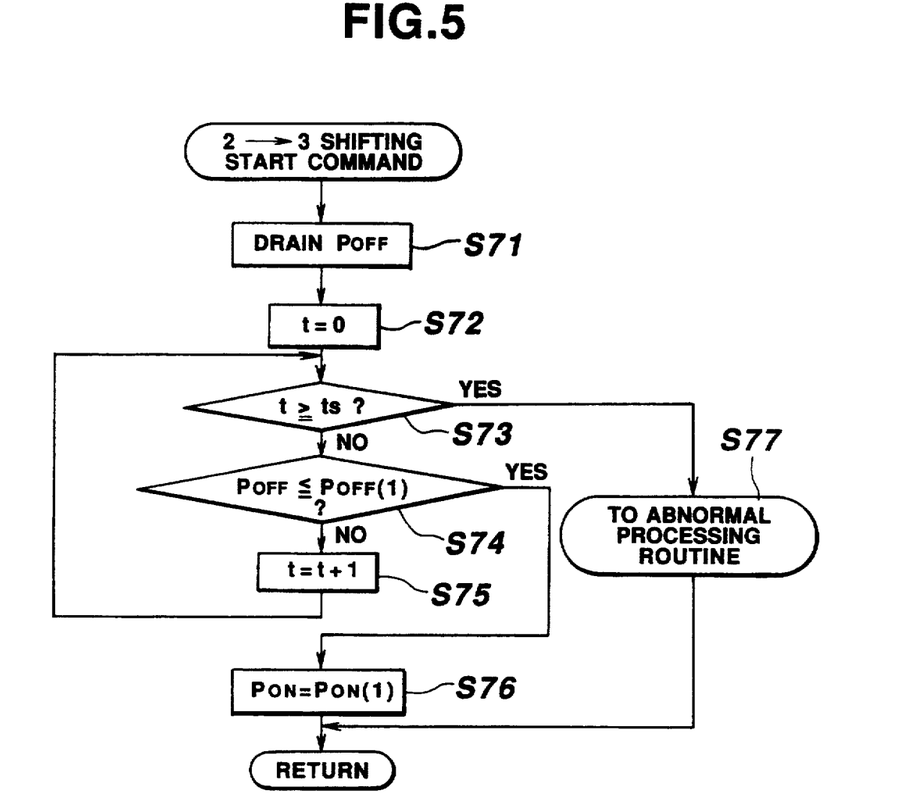
FIG. 5 is a flow chart showing another control program applied to another embodiment of the shift control system according to the present invention.

Referring to FIG. 5, there is shown a flow chart applied to a second embodiment of the shift control system for the automatic transmission.

In this embodiment, at 2→3 shifting command moment $t_0$, the disengagement pressure $P_{OFF}$ is drained off in a step S71. In a step S72, a timer t is reset and a time period from the moment $t_0$ of the shift command is counted by the timer t. In a step S73, it is judged whether or not the passed time period t is greater than a predetermined time period $t_s$, that is, it is judged whether an abnormality has happened or not. When the judgment in the step S73 is "NO", the program proceeds to a step S74 wherein it is judged whether the disengagement pressure $P_{OFF}$ is lower than a preset micro-value $P_{OFF}(1)$. If the judgment in the step S74 is "NO", the program proceeds to a step S75 wherein t is incremented as t+1(t←t+1) and the program returns to the S73. That is to say, the program is repeated among the steps S73, S74 and S75 until the disengagement pressure $P_{OFF}$ becomes lower than the micro-value $P_{OFF}(1)$. When the judgment in the step S74 is "YES", that is, when $P_{OFF} \leq P_{OFF}(1)$, the program proceeds to a step S76 wherein the engagement pressure $P_{ON}$ is set at a value $P_{ON}(1)$ shown by a two-dotted line in FIG. 6. Following this, the shift operation is finished.

When the judgment in the step S73 is "YES" (t=≥$t_s$), the program proceeds to a step S77 wherein an abnormal routine is carried out for forbidding shifting or selecting the fourth shift.

With the thus arranged shift control system, when the falling of the disengagement pressure for the disengaged element becomes greater than a predetermined value during the redeployment of friction elements, the engagement pressure is adjusted at a predetermined value decided according to the transmission input torque and the gear ratio, and the torque phase is finished while keeping the engagement pressure at the predetermined value. Accordingly, the falling of the torque during the torque phase is suppressed to a minimum and therefore a better shift feeling is obtained. Furthermore, since this merit is achieved without using a one-way clutch, it becomes possible to form the automatic transmission without being enlarging the diameter.

What is claimed is:

1. A shift control system of an automatic transmission for use in an automotive vehicle, the automatic transmission which has a plurality of friction elements shifting by engaging one of the friction elements and disengaging another one of the friction elements, the engagement and disengagement being carried out by controlling hydraulic pressure supplied to the friction elements, respectively, the shift control system comprising:

means for detecting and outputting a drained state where disengagement pressure of the disengaged friction element is lower than a first predetermined value; and means for adjusting engagement pressure of the engaged friction element as a function of a value which is a quotient of an input torque by a value determined from a kind of shifting when said adjusting means receives a signal indicative of the drained state from said detecting means.

2. A shift control system of an automatic transmission for use in an automotive vehicle, the automatic transmission which has a plurality of friction elements shifting by engaging one of the friction elements and disengaging another one of the friction elements, the engagement and disengagement being carried out by controlling hydraulic pressure supplied to the friction elements, respectively, the shift control system comprising:

means for detecting input torque;

means for detecting a gear ratio;

means for detecting and outputting a drained state where disengagement pressure of the disengaged friction element is lower than a first predetermined value;

means for adjusting engagement pressure of the engaged friction element as a function of a value which is determined by a quotient of an input torque by a value determined from a kind of shifting when said adjusting means receives a signal indicative of the drained state from said detecting means; and means for carrying out an abnormal routine including one of forbidding shifting and selecting an upper shift when a time from a start of the shifting to a start of the drained state is greater than a preset time.

3. In a shift control system of an automatic transmission having a plurality of friction elements, wherein shifting includes engagement of one of the friction elements and disengagement of another one of the friction elements which are carried out by a method of controlling hydraulic pressure supplied to the friction elements, respectively, said method comprising the steps of:

detecting disengagement pressure of the disengaged friction element;

comparing the disengagement pressure to a first predetermined value in order to determine a time at which a value of the disengagement pressure is less than or equal to the first predetermined value; and adjusting engagement pressure of the engaged friction element at a second predetermined value determined as a function of input torque and gear ratio when it is judged that the time is detected.

4. A shift control system of an automatic transmission for use in an automotive vehicle, the automatic transmission which has a plurality of friction elements shifting by engaging one of the friction elements and disengaging another one of the friction elements, the shift control system comprising:

a pressure source;

a solenoid valve communicating with said pressure source and controlling engagement pressure supplied to the friction element to be engaged;

a sensor detecting disengagement pressure of the engaged friction element; and a controller comparing the disengagement pressure to a first predetermined value in order to determine a time at which a value of the disengagement pressure is less than or equal to the first predetermined value, said controller controlling said solenoid valve so as to adjust the engagement pressure at a second predetermined value determined according to function of input torque and gear ratio when the time is detected.

5. A shift control system as claimed in claim 4, wherein said controller is connected to an input torque sensor, an output rotating speed sensor and a throttle sensor, and calculates the input torque and the gear ratio on the basis of signals therefrom.

* * * * *